(No Model.)
A. C. ENGERT.
Appliance for Distributing Sound, &c.
No. 239,473. Patented March 29, 1881.
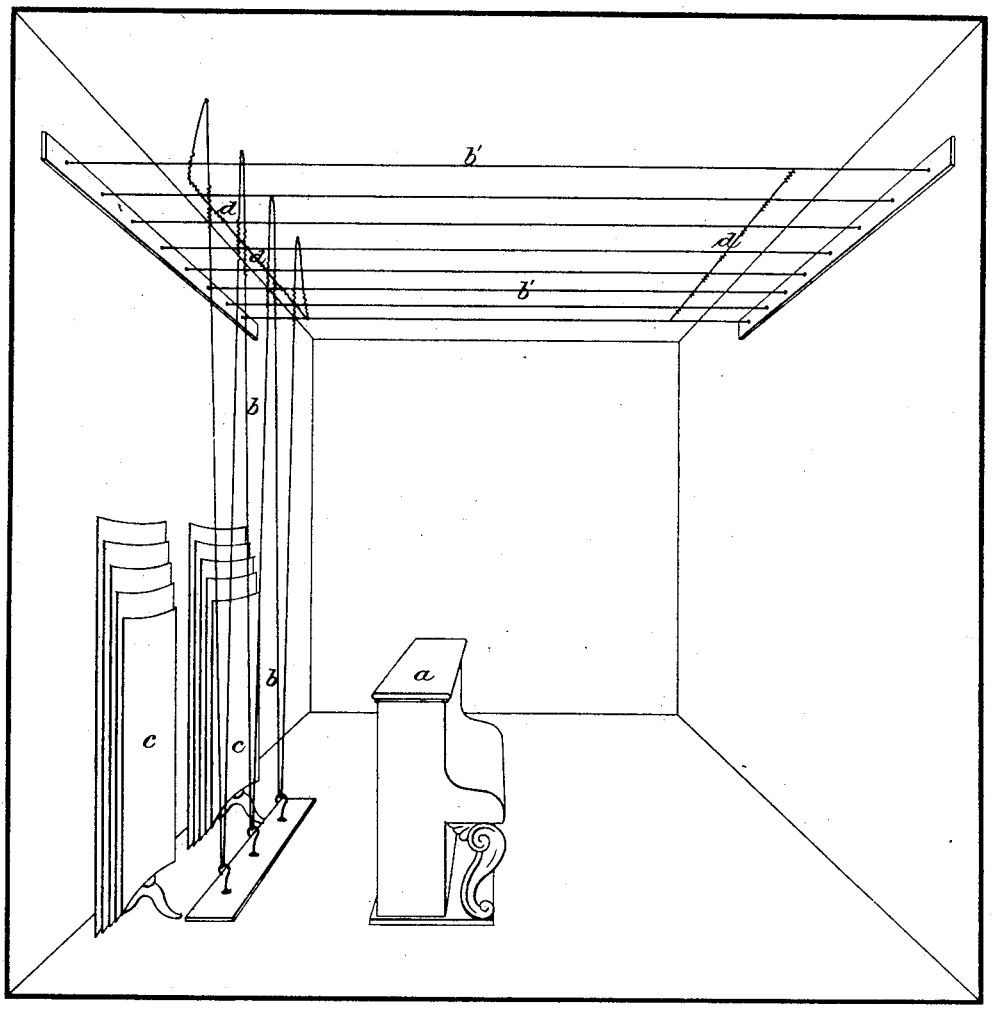
WITNESSES
Wm A. Skinkle
Geo W. Buck
By his Attorneys
Baldwin, Hopkins & Payton.
INVENTOR
Adam C. Engert,
N. PETERS, PHOTO-LITHOGRAPHER, WASHINGTON, D. C.

UNITED STATES PATENT OFFICE.

ADAM C. ENGERT, OF THREE MILLS LANE, BROMLEY-BY-BOW, COUNTY OF MIDDLESEX, ENGLAND.

APPLIANCE FOR DISTRIBUTING SOUND, &c.

SPECIFICATION forming part of Letters Patent No. 239,473, dated March 29, 1881.

Application filed July 6, 1880. (No model.) Patented in England May 12, 1880.

*To all whom it may concern:*

Be it known that I, ADAM CYRUS ENGERT, a subject of the Queen of Great Britain, residing at Three Mills Lane, Bromley-by-Bow, in the county of Middlesex, England, have invented certain new and useful Improvements in Appliances for Distributing Sound, and also for better obtaining a uniform distribution of sound throughout the interior of buildings, (for which I have received Letters Patent in England, No. 1,955, dated May 12, 1880;) and I do hereby declare that the following is a full, clear, and exact description of the invention, which will enable others skilled in the art to which it appertains to make and use the same.

In order better to obtain a uniform distribution of sound throughout the interior of large rooms, churches, public halls, and the like, and to prevent return-waves of one sound interfering with and preventing the distribution of other sounds, I employ a number of wires, preferably of steel or iron, stretched along the room or building, generally along its longest length, and strained tight until they are so tuned as readily to take up vibrations in the air such as are produced by the loudest or strongest return-wave which previously interfered with the proper distribution of sound throughout all parts of the building. Should any return-wave still exist the tuned wires will take up and distribute such waves so quickly that they cannot do harm, and will prevent their interfering with the distribution of other succeeding sounds, and consequently no after echo will be experienced. As the velocity of sound in steel is about fifteen times greater than in air, steel wires are preferably employed.

To strain the wires to the extent requisite it is necessary to employ some powerful straining mechanism. Preferably I wind one end of the wire upon a strong pin or barrel, which can be turned by a hand-lever, and is then held from turning back by a pawl engaging with the teeth of a ratchet-wheel formed upon it, as in mechanism commonly employed for straining the wires of wire fences. The wires may be stretched across the room or building at any desired distance below the roof or ceiling.

In cases where it is required to reduce return-waves from domes and arches, corners, or recesses of buildings, so that no annoyance shall be experienced from them, I also stretch wires across such corners or recesses and connect these wires with the horizontal wires before mentioned, which are stretched lengthwise of the building. The connection of the wires one with another is made by attaching to the strained and tuned wires, near to their ends, a connecting-wire, which is also strained and kept strained by a coiled spring at one or other of its ends or intermediate of its length. Also, in cases where the height of the building permits, I stretch a second layer of horizontal wires at a distance above the first layer, and like them properly tuned, and connect them all one with the other by cross-wires and spiral springs. In the same way three, four, or more layers of tuned wires might be used, if required. In the same way any natural or artificial resonance may be distributed throughout the whole of a building. As, for example, when metal resonating-plates are used, as decribed in my former application of September 8, 1879, for a United States patent, wires may be stretched, until properly tuned, a short distance in front of the plates, and be connected by strained wires and springs to the horizontal wires before mentioned. Or, in the same way, tuned wires may be stretched in the vicinity of musical instruments, as, for example, pianos or organs, or may be attached directly to such instruments, and may also be used for conveying musical or other sounds produced in one place to any place where it is desired that the music or other sound shall be heard, whether in the interior of a building or in the open air.

If only a single layer of horizontal wires is used the several wires of this layer should be connected one with the other near their ends by wires and spiral springs, so that the vibrations may circulate from one to the other.

By the accompanying illustration of my invention is shown the interior of a room or hall containing a piano, *a*, and resonant plates *c c*, with the vertical wires *b*, terminating at the lower ends intermediate the piano and plates, and suitably fastened. The horizontal wires *b'* are connected with each other and with the vertical wires by spiral springs or coils *d d* in the wires. The two sets of wires $b\ b'$ are held securely at their ends in any suitable way. The drawing shows only one set of the horizontal wires, but they may be duplicated in an obvious manner, and any desired number of sets or layers one above the other be employed and connected one to the other by cross-wires or by coiled springs.

Having thus described my invention, I would state that I am aware that it has before been proposed to hang a number of wires across the interior of a room or building with the view, as it was stated, of dividing or breaking up the sound, and that such wires have been stretched or strained; and, further, that in a series of wires arranged across a room, &c., each wire has been connected with one other wire. I do not, therefore, claim the exclusive use of wires suspended across the interior of a building, room, &c., nor every way of stretching or arranging wires in series, nor even a series of wires in which each wire is connected with one other wire. I am not aware, however, of the employment prior to my invention of connected strained wires tuned to render them capable of taking up and conveying with great rapidity the vibrations of any desired note; nor of the employment of the strained cross-wires, nor of the employment of layers of strained connected wires one above the other, as hereinbefore described.

I claim as of my own invention—

1. The arrangement of the stretched wires strained across a room, &c., and all connected one with another near their ends by coiled-wire springs, substantially as and for the purpose set forth.

2. The combination of the strained vertical wires and the strained horizontal wires, all connected one with the other by the strained cross-wires or coiled springs, substantially as and for the purpose set forth.

A. C. ENGERT.

Witnesses:
 CHAS. BERKLEY HARRIS,
 JOHN DEAN,
  Both of Gracechurch street, London.